L. P. MOOERS.
BALL BEARING.
APPLICATION FILED NOV. 14, 1908.

1,093,348.

Patented Apr. 14, 1914.

Witnesses:
Nathan F. Fretter
Brennan B. West

Inventor:
Louis P. Mooers
By Bates, Fouts & Hull
Attys

UNITED STATES PATENT OFFICE.

LOUIS P. MOOERS, OF GENEVA, OHIO, ASSIGNOR OF ONE-HALF TO J. S. BRETZ COMPANY, OF NEW YORK, N. Y., A CORPORATION OF NEW JERSEY.

BALL-BEARING.

1,093,348.

Specification of Letters Patent.

Patented Apr. 14, 1914.

Application filed November 14, 1908. Serial No. 462,699.

*To all whom it may concern:*

Be it known that I, LOUIS P. MOOERS, a citizen of the United States, residing at Geneva, in the county of Ashtabula and State of Ohio, have invented a certain new and useful Improvement in Ball-Bearings, of which the following is a full, clear, and exact description, reference being had to the accompanying drawings.

My invention relates to ball bearings and more particularly appertains to a means for fastening the ball retaining means in proper position, and furthermore, to so form the raceway for the balls that each ball will contact with the said raceway at four points only.

Generally speaking, the invention comprises the elements and combinations thereof set forth in the accompanying claim.

Figure 2:
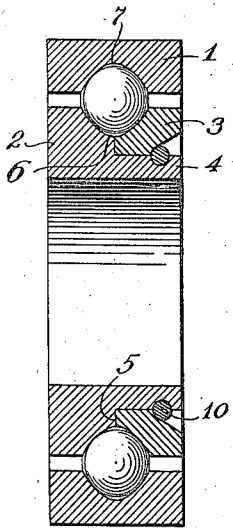
Figure 1:
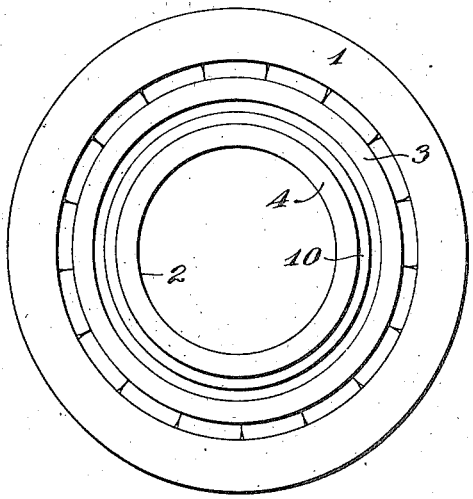
Figure 3:
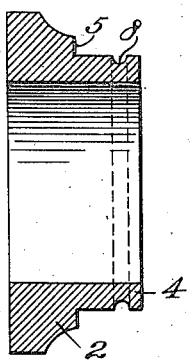
Figure 4:
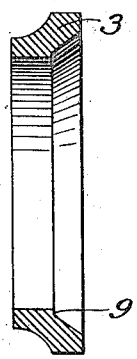
Figure 5:
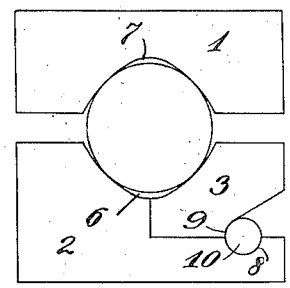

Reference should be had to the accompanying drawings forming a part of this specification in which Figure 1 is a side elevation of the ball bearing; Fig. 2 is a central transverse cross section of Fig. 1; Figs. 3 and 4 are the cooperating sections of the inner ring member of the bearing; Fig. 5 is a diagrammatic illustration showing the contacting points of the balls with the raceway, as well as showing the retaining member.

The ball bearing herein shown and described comprises an outer ring member or ball cup 1 and an inner ring member, the said inner ring member comprising the two coöperating sections or cones 2 and 3. The part 2 of the inner ring is formed with a projecting flange 4 which is of less external diameter than the outer part of the ring thereby forming a shoulder 5. The part 3 is formed of an internal diameter to closely fit the walls of the flange 4 and both of these members when assembled are formed with a continuous groove 6. The inner side of the ring 1 is likewise formed with a groove 7, and the grooves 6 and 7 in the inner and outer ring members, form the raceway in which the balls are adapted to travel. The formation of the walls of the grooves 6 and 7 is of a shape such that the balls will contact with the walls thereof only at four points, as will be clearly seen in Fig. 5. In this way the friction between the balls and the moving part will be materially reduced as against a construction where the ball is in substantial contact with the points of its raceway. Again, by providing four points of contact between the balls and the walls of the raceway, the outer and inner rings are always correctly alined with respect to each other, and whatever side thrust there may be between the outer and inner ring members relative to each other, the thrust will be borne at only two points upon each ball and thereby the friction will be reduced.

As before stated, the part 3 is adapted to engage the outer portion of the flange 4 and to seat itself upon the shoulder 5 in which position, the grooves in the parts 2 and 3 will coöperate to form the completed inner raceway for the balls.

As a means for securing the retaining member 3 in place, I have provided the following construction: The flange 4 is provided with a groove 8 extending entirely around it, near the outer end thereof, and the inner portion of the member 3 flares outwardly toward the top and at the bottom of the flaring portion is formed with a shoulder 9.

The parts just described are so proportioned that when in assembled position, the shoulder 9 is at the inner edge of the groove 8. When in assembled position, a wire ring 10 is crowded into the semi-circular groove 8, which ring at the same time will bear upon the shoulder 9. The ring when in the position shown in Fig. 2 will hold the ball retaining ring 3 against outward movement by virtue of its coöperation with the flange 9. The ring 10 is made of such diameter as to closely fit within the groove 8. Preferably this ring is made of soft metal which possesses sufficient strength to hold the ring 3, but may be readily cut out by using a suitable sharp tool.

In assembling the bearing, the member 2 is laid upon a flat surface and the member 1 is slightly raised so as to allow sufficient opening between the curved raceway portions in the members 1 and 2 to slip the balls in place. When all the balls are in place, the member 1 is lowered so as to be in the same plane as the part 2 and the retaining ring 3 is placed in position. Next the wire ring 10 is forced into the position shown in Fig. 2, in which position the bearing is complete.

If it be desired to dis-assemble the members of the bearing for any purpose, the entire bearing is placed in a suitable chuck and inasmuch as the wire 10 is formed of soft material, the same may be removed by any sharp instrument. If it is convenient, the bearing may be placed in the chuck of a lathe, and the member 2 held against rotation, whereupon a tool with a long sharp point may be inserted into the space between the member 2 and the retaining ring 3, which upon the operation of the lathe, will cut the ring 10 so that the ring 3 may be readily removed.

The construction I have described is very convenient when it is desired to adjust the members 2 and 3 for wear. The soft metal ring being removed, the members 2 and 3 may be ground the necessary amount, the bearing assembled, and a new ring inserted in the groove 8.

Having thus described my invention, what I claim is:

In a ball bearing, the combination of a member constituting a portion of the raceway and having a smooth annular flange, a removable ring constituting another portion of the same raceway and having a smooth cylindrical surface seated on said flange, said flange and ring having a groove and shoulder respectively coöperating with each other, a soft metal wire in said groove and extending across said shoulder, the ring carrying the shoulder being flared away from the groove to afford a space for the insertion of the wire or for the insertion of a wire removing tool, the throat of the opening thus provided to the groove being narrower than the wire when in place, a grooved annular member completing the raceway of the bearing, and a plurality of balls in said raceway.

In testimony whereof, I hereunto affix my signature in the presence of two witnesses.

LOUIS P. MOOERS.

Witnesses:
 WARD B. MARTIN,
 EMMA D. WRIGHT.